Feb. 25, 1964 F. G. HUGHES, JR 3,122,332

TAPE DRIVE DEVICE

Filed Dec. 30, 1957 2 Sheets-Sheet 1

INVENTOR

Frederick G. Hughes, Jr.

BY Geoffrey Knight

ATTORNEY

Feb. 25, 1964 F. G. HUGHES, JR 3,122,332

TAPE DRIVE DEVICE

Filed Dec. 30, 1957 2 Sheets-Sheet 2

INVENTOR
Frederick G. Hughes, Jr.

BY Geoffrey Knight
ATTORNEY

United States Patent Office
3,122,332
Patented Feb. 25, 1964

3,122,332
TAPE DRIVE DEVICE

Frederick G. Hughes, Jr., Poughkeepsie, N.Y., assignor to International Business Machines Corporation, New York, N.Y., a corporation of New York Filed Dec. 30, 1957, Ser. No. 706,184
12 Claims. (Cl. 242—55.12)

This invention relates to a machine for feeding tape. More particularly, the invention relates to means for continuously controlling tape reel drive mechanisms during the automatic reeling and unreeling of tape.

It is therefore the principal object of the invention to provide, in a high speed tape feeding machine, improved means for automatically reeling and unreeling tape.

Machines have been designed which are capable of feeding record tape through a reading and recording head at very high speeds, with the ability to reverse direction of the tape feed in very short periods of time, all without imposing any excessive stresses on the tape. In such machines, the tape is wound around rotating capstans used to draw the tape from vacuum columns, and feed it past the read and write head. Each of the vacuum columns has therein means responsive to the position of the respective loop for maintaining a relatively stable position of its loop within the column. In one such machine the loop sensitive means consists of a pair of vacuum switches located on the back panel of a vacuum column. The switches are spaced at predetermined minimum and maximum positions. Thus as the capstan withdraws tape from one vacuum column and the total length of the tape stored therein is reduced to this predetermined minimum, the vacuum switch instructs the control means to initiate rotation of the related reel at some acceleration rate to feed tape into the vacuum column. As soon as the tape exceeds the predetermined maximum length, the vacuum switch located at this predetermined maximum position instructs the associated control means to brake the reel to a stop. During this time, the tape leaving the drive capstan is directed past the read and write head and into the other vacuum column. When the tape therein reaches a predetermined maximum length, its associated vacuum switch instructs the associated control means to initiate rotation of its related reel to remove the excess tape from the vacuum column by winding it onto the reel. Likewise, when the tape loop length is reduced to the predetermined minimum, the associated control means is effective to cause braking of the reel to terminate the winding operation. The loop sensitive means within the vacuum columns control the reel drive mechanism in such a manner that the loops are self-compensating. The tape reel drive mechanism for each reel operates independently of the other, and both reels are driven independently of the feed of tape through the read and write head unit. This tape feed machine referred to above is fully described in the copending application of Walter S. Buslik and Thomas L. Vinson, Serial No. 468,832, filed November 15, 1954, now Patent No. 2,919,076.

The above-mentioned loop sensitive means within the vacuum columns has provided for intermittent control of the reel drive mechanism. In accordance with the present invention, means are provided to control the reel motors continuously in relation to the lengths of the loops rather than intermittently when the loops pass the limit positions. In a preferred embodiment of the invention, there has been provided a pair of control columns, adjacent to the vacuum columns, in which are disposed the loop sensitive means. This double column arrangement, with the tape loop in one column and the loop sensitive means in the adjacent column, provides for continuous control of the reel drive mechanism.

Accordingly, a further object is to provide, in a high speed tape feeding machine, a means for continuously controlling of the reel drive mechanism.

A still further object is to provide a loop sensing means capable of continuously sensing incremental changes in loop position.

A particular object is to provide, in a machine which operates on a section of tape between winding and unwinding reels, control means permit a higher rate of feed of tape past a tape utilization means.

Other objects of the invention will be pointed out in the following description and claims and illustrated in the accompanying drawings, which disclose, by way of example, the principle of the invention and the best mode which has been contemplated of applying that principle.

Figure 1:
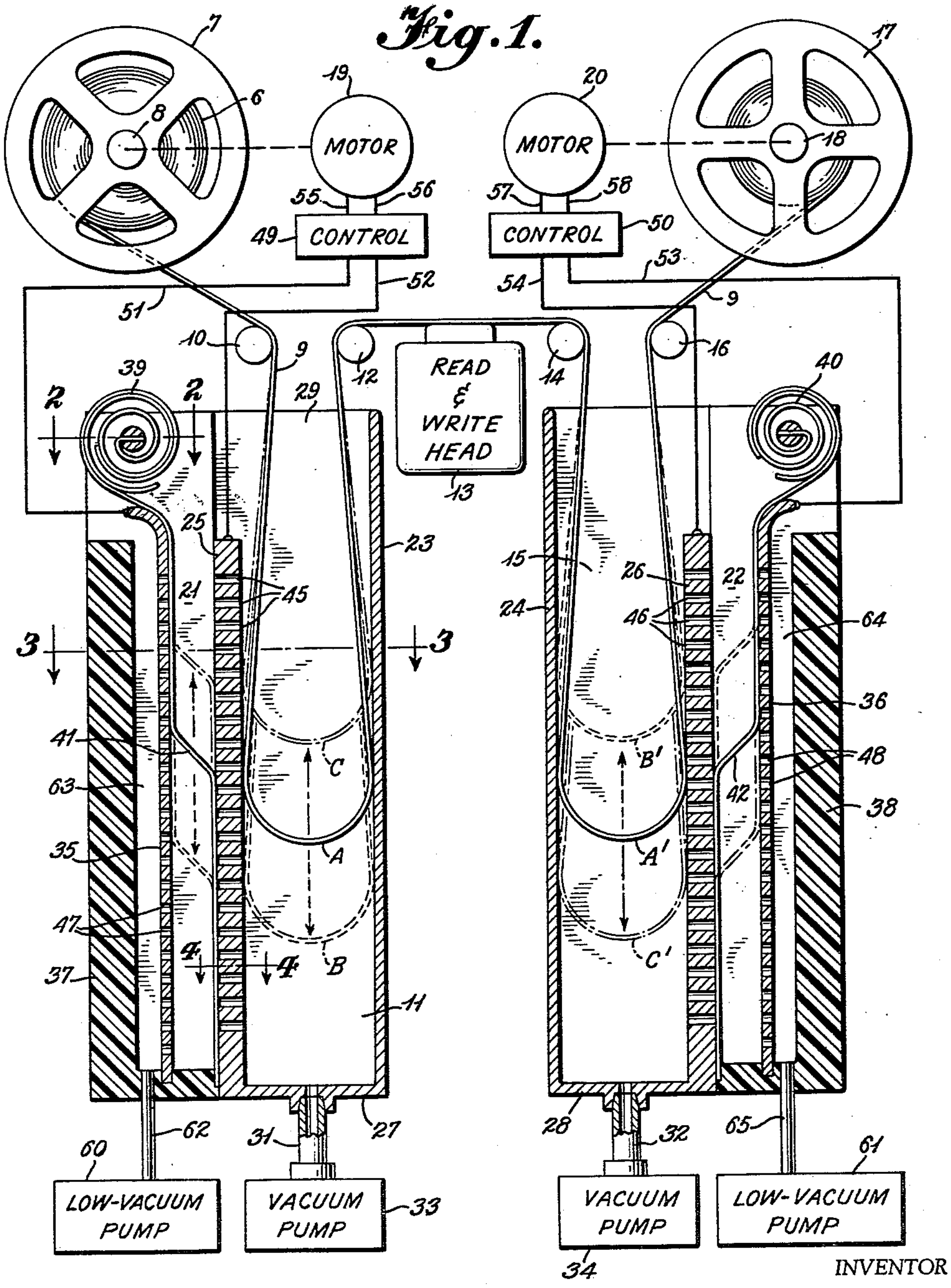
FIG. 1 is a front elevational view, with parts in section, of a tape feed machine embodying the invention.

Before proceeding to the description of the operation of the automatic tape drive control device, a description will be given of a tape feed machine which may utilize this invention as a part thereof. The invention was conceived to provide an improved means for continuously controlling the reel drive mechanisms in a tape feed machine, but may be usefully employed in other automatic reeling and unreeling environments.

The description will be limited to a condition where the tape is already loaded in the machine, and means for stopping and driving the tape in a forward and a backward direction will be explained. Basically, the tape feed machine used is the one fully described in the beforementioned copending application of Walter S. Buslik and Thomas L. Vinson, Serial No. 468,832, filed November 15, 1954, with the improved control means incorporated. A general understanding of the tape machine and its functions may be obtained by reference to FIG. 1 of the drawings. A pair of tape reels adapted to hold a coil of record tape are continuously driven to provide a pair of tape loops from which tape may be supplied to a tape sensing head as the tape is fed in either of two directions. A tape reel 7, which we shall designate as a file reel, is mounted on a drive spindle 8 and has thereon a coil of tape 6 on which data has been recorded. In the forward direction, the tape will pass through a tape reading and recording head unit 13 and will be coiled on a second reel 17, which is designated herein as a machine reel. The machine reel 17 is mounted on a drive spindle 18. The file reel drive spindle 8 and the machine reel drive spindle 18 are selectively driven in either direction by a pair of servo type motors 19 and 20. Upon selecting the direction of rotation of these motors, the spindles and consequently the tape reels attached thereto may be caused to reel or unreel tape from the coil thereon.

It has been mentioned that tape from the loop supply in the vacuum columns 11 and 15 is driven past the tape heat unit 13 by means of a pair of rotating drive capstans 12 and 14 in which a vacuum provides the necessary suction to keep the tape in contact with the capstan. Each of the vacuum drive capstans 12 and 14 is capable of rotating in either of two directions in response to the manner in which a motor is connected to it by an electromagnetic clutch (not shown). An electromagnetic brake is mounted on each of the vacuum drive capstans to lock them, at times, against rotation. Upon selective clutching of these electromagnetic clutch mechanisms, the associated vacuum drive capstans 12 and 14 can cause tape to be removed from or added to either of the vacuum columns 11 and 15. The motor, electromagnetic clutch and electromagnetic brake associated with each capstan are the same as those shown in the copending application of Harold P. Wicklund and Hugo L. Panissidi, Serial No. 556,671, filed December 30, 1955.

Since the machine is designed for high speed feed of tape through the tape head unit 13 and very rapid acceleration, for example, starting and stopping, it is important that the means for feeding tape past head unit 13 be subjected to only a small load or mass of tape, and to this end the driving mechanism for the reels 7 and 17 provides a pair of tape loops disposed in vacuum columns 11 and 15. It is necessary to provide means to control the rate and the direction of rotation of the reels 7 and 17 to maintain the lengths of the loops within certain limits. In the application referred to, this was accomplished by means of vacuum switches located in the columns at the limits. In accordance with the present invention, control columns 21 and 22 are provided adjacent to vacuum columns 11 and 15 for this purpose. Since the control columns 21 and 22 are of the same construction, and the vacuum columns 11 and 15 are of the same construction, a description of control column 21 and vacuum column 11 (FIGS. 1 and 3) will serve as a description for both.

As the tape 9 leaves file reel 7, it passes over a guide idler 10, down into vacuum column 11, up around drive capstan 12, past the read and write head unit 13, down around drive capstan 14, into vacuum column 15, and up over guide idler 16, to machine reel 17.

The vacuum column 11 herein illustrated comprises a wall 23 to the right, a perforated metal partition 25 to the left, a back panel 29, a front panel 30, which may be transparent, and a bottom wall 27. A conduit 31 connects the space in column 11 to a vacuum pump 33. Side walls 23 and 25 of vacuum column 11 are of a width approximately equal to the width of the tape 9. When a tape loop is formed in the vacuum column 11, the oppositely disposed marginal edges of the loop will therefore be substantially in contact with the back plate 29 and front plate 30 of the vacuum column 11. The outside of the tape loop is spaced from the side walls of the vacuum column in the upper part of the loop, but the lower part of the loop is in substantial contact with the side walls. This disposition of the tape loop within the vacuum column 11 is assured by the position of the tape guide idler 10 and the drive capstan 12.

Atmospheric pressure prevails on the outside surface of the loop above the portions in contact with the side walls of the column, and on the entire inside surface of the loop. At the outside surface of the loop below the portion in contact with the side walls of the column 11 a vacuum is maintained by vacuum pump 33 .

The control column 21 herein illustrated comprises the perforated metal partition 25 as its right wall, perforated metal wall 35 as its left wall, and insulation 37 as its back, front and bottom walls. Within the control column 21 is a sensing tape 41 composed of a piece of plastic tape 44 (FIG. 4) coated with a conductor 43 on one side. The plastic side 44 of the sensing tape faces the perforated metal partition 25. The bottom end of the sensing tape 41 is anchored to the bottom of the partition 25. The top end of the sensing tape 41 is attached to a fine adjustable spring 39 mounted in the upper left-hand corner of the control column 21. A low vacuum pump 60, connected by conduit 62, maintains the pressure in control column 21 at slightly less than atmospheric pressure, but considerably higher, that is, less of a vacuum than the pressure in the bottom portion of column 11. An air chamber 63, open to the atmosphere, is provided adjacent to control column 21 and is in communication with the column 21 through perforations 47 in wall 35. The metal coating 43 on the sensing tape 41 (FIG. 4) and the metal partition 25 comprise the plates of a capacitor, the capacitance of which will vary as the amount of sensing tape 41 against the perforated metal partition 25 varies. The portion of the sensing tape 41 against the perforated metal partition 25 establishes the only substantial capacitance. The portion of the sensing tape 41 against the perforated metal wall 35 has zero capacitance (FIG. 1), since the perforated metal wall 35 shorts the metal coating 43 on the sensing tape 41. The condition of maximum capacitance exists when the loop in vacuum column 11 is at the top of the column, and the entire sensing tape 41 in control column 21 is against the perforated metal partition 25. The condition of minimum capacitance exists when the loop in vacuum column 11 is at the bottom of the column, and nearly all of the sensing tape 41 in control column 21 is against the perforated metal wall 35.

The first description of the operation of the device will be limited to the static condition A—A' shown in FIG. 1. The reversely curved or lower part of the tape loop in vacuum column 11 is in substantial contact with the side walls 23 and 25, which partially closes the bottom portion of the column 11 from the atmosphere. The apertures 45 in the perforated metal partition 25 allow a suction force or pressure difference to act on sensing tape 41 so that it is forced against the partition 25. The number of apertures 45 that become exposed to the suction force determines the amount of sensing tape 41 that is pulled against the partition 25. The vacuum pump 33 evacuates the space below the loop and creates a suction force or pressure difference in those apertures 45 in the partition 25 below the portion of the loop in contact with wall 25. The suction force in the apertures 45 acts to pull a corresponding portion of sensing tape 41 in the control column 21 firmly against the partition 25. The amount of sensing tape 41 that is pulled against the perforated metal partition 25 thereby depends on the position of the loop in contact with wall 25. The apertures 45 in the partition 25 above the reversely curved part of the tape, where it is in contact with walls 23 and 25, has atmospheric pressure on both sides. Before the vacuum pump 33 is turned on, the sensing tape 41 in control column 21 lies along perforated metal wall 35 and crosses the bottom of control column 21. As vacuum is applied, the lower portion of the sensing tape 41 is drawn against the perforated partition 25 and bends away sharply above the vacuum influence. The portion of sensing tape 41 in contact with the partition 25 has vacuum acting on the side against the perforated metal partition 25, and pressure slightly below atmospheric acting on the other side. The apertures 47 in the perforated metal wall 35 provide an air relief or breathing path between control column 21 and air chamber 63.

Figures 2, 3, 4, 6:
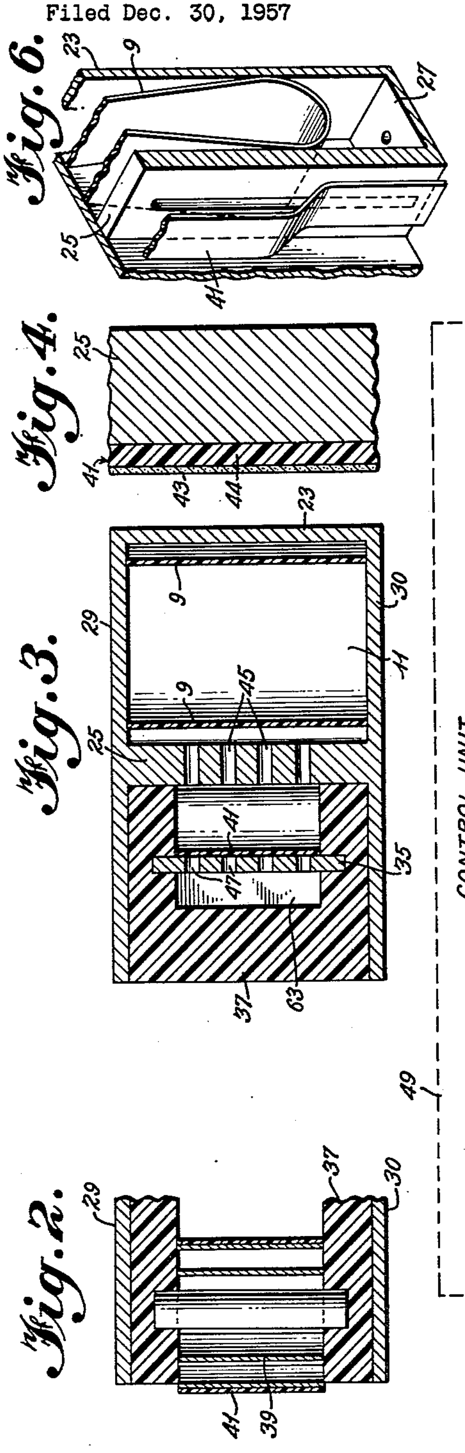
FIG. 2 is an enlarged horizontal section on the line 2—2 of FIG. 1.
FIG. 3 is an enlarged horizontal section on the line 3—3 of FIG. 1.
FIG. 4 is an enlarged horizontal section on the line 4—4 of FIG. 1.
FIG. 6 is a fragmentary perspective section showing an alternate form of the sensing means.

FIG. 6 of the drawings illustrate a fragment of the wall 25 showing a longitudinal slot in place of the apertures in said wall, a modification which permits the ripple in the sensing tape to continuously follow the loop, as the length of tape in the column varies.

In the forward direction, the drive capstans 12 and 14 rotate in a clockwise direction to remove tape from vacuum column 11, and to discharge it into vacuum column 15. The portions of the loop in contact with the side walls 23 and 25 begin to move upward, exposing additional apertures 45 in the metal partition 25 to the vacuum in column 11; the additional pressure difference on the sensing tape 41 pulls that portion of the sensing tape near the apertures firmly against the perforated metal partition 25. With more of the sensing tape 41 now pulled against the perforated metal partition 25, the upper portion of the sensing tape 41 redistributes itself so that the position of the ripple in the sensing tape 41 moves upward, following the portion of the tape loop in contact with the partition 25. The overall shape of the sensing tape 41 remains similar. The new position C of the tape loop in vacuum column 11, and the corresponding new position of the sensing tape 41 in control column 21 are indicated in FIG. 1 of the drawings.

At the same time, the tape removed from vacuum column 11 is discharged into vacuum column 15. The loop in vacuum column 15 begins to move downward. The portions of the tape loop in contact with the side walls 24 and 26 begin to move downward, exposing additional apertures 46 in the perforated metal partition 26 to the atmosphere. At the same time, this atmospheric pressure in the additional apertures 46 acts to create a reverse pressure difference on a portion of the sensing tape 42 in control column 22, and forces the sensing tape 42 away from the perforated metal partition 26. The reverse pressure difference on this portion of sensing tape 42 is created by the atmospheric pressure on the inside surface, and slightly below atmospheric pressure on the outside surface of the tape 42. A quick response on this portion of the sensing tape 42 is assured by the low vacuum pump 61, which keeps the pressure in the space on the bottom side of the tape 42 at slightly below atmospheric pressure. With less sensing tape 42 against the perforated metal partition 26, the upper portion of the sensing tape 42 redistributes itself so that the position of the ripple in sensing tape 42 moves downward, following the portion of the tape loop in contact with the perforated metal partition 26. The overall shape of the sensing tape 42 remains similar. The new position C′ of the tape loop in vacuum column 15, and the corresponding new position of the sensing tape 42 in control column 22 are indicated in FIG. 1 of the drawings.

In the reverse direction, the drive capstans 12 and 14 rotate in a counterclockwise direction to remove tape from vacuum column 15, and discharge it into vacuum column 11. The loop in vacuum column 15, and the ripple portion of the sensing tape 42 in control column 22 move upward. The loop in vacuum column 11, and the ripple portion of the sensing tape 41 in control column 21 move downward. The new positions of the loops B—B′ and the corresponding new positions of the sensing tapes are illustrated in FIG. 1 of the drawings.

Figure 5:
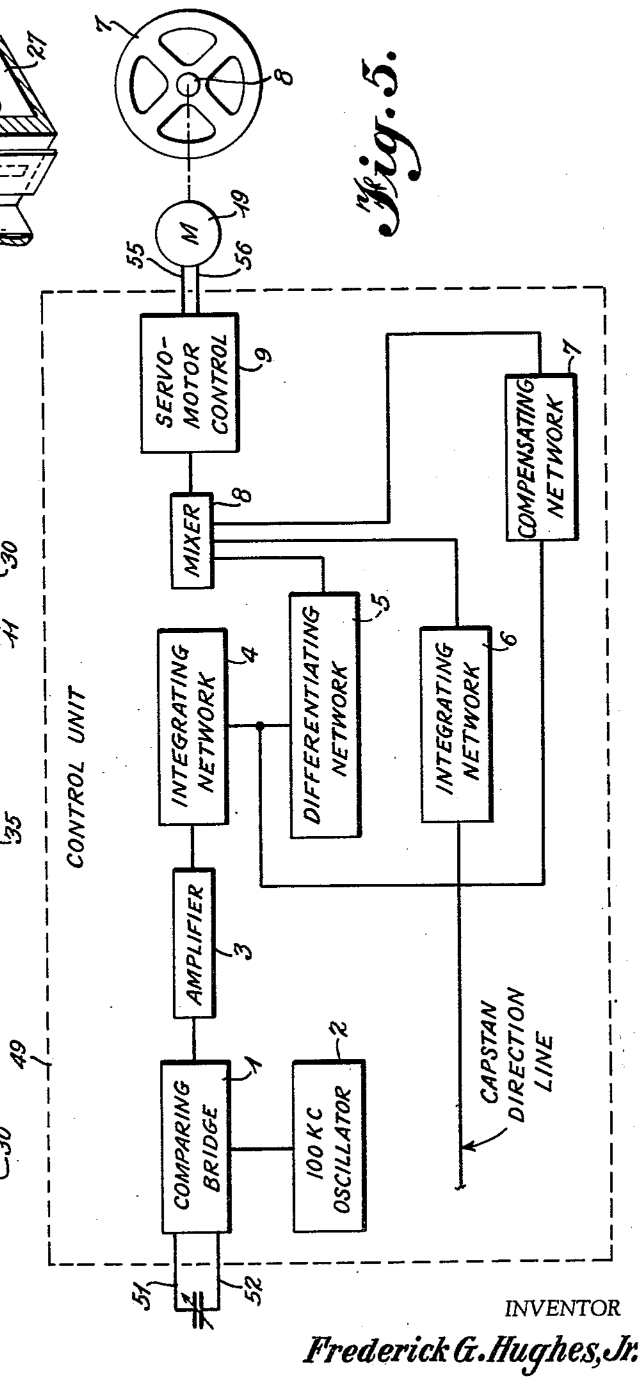
FIG. 5 is a block diagram of the control circuit.

It has been mentioned that the variable capacitance determined by the position of the ripple in the sensing tape is used to control a voltage which in turn controls the reel drive motor. There are a number of control circuits capable of doing this. A possible control circuit in block form is illustrated in FIG. 5 of the drawings.

Box 1 contains a bridge network which compares the capacitance of the variable capacitor against the capacitance of a standard capacitor. Power for this comparing bridge is supplied from Box 2 which contains an oscillator of a frequency high enough for the time between pulses to be small in comparison to the rate of change of the variable capacitor. The output of Box 1 is a high frequency signal whose amplitude is proportional to the difference between the variable capacitance and the standard capacitance.

Box 3 contains an amplifier necessary to increase the voltage and the power output of Box 1.

Box 4 contains an integrating and detecting circuit necessary to convert the variable high frequency pulses into a voltage which is proportional to the position of the tape in the column. The voltage is a minimum when the tape is at the top of the column, and is a maximum when the tape is at the bottom of the column. A predetermined position on the column (A, FIG. 1) is the normal or rest position of the tape loop and corresponds to a given normal voltage.

Box 5 contains a differentiator and an amplifier. Since the optimum reel acceleration is dependent on how fast tape is pulled out of or put into a column, the voltage output of Box 4 is differentiated and amplified. This produces a signal which is proportional to the rate of change of net tape in or out of the column. No voltage is generated from stage 5 if the reel is putting tape into the column as fast as the capstan is taking tape out of the column.

The capstan direction signal is useful to control the position of the tape in the column. Box 6 detects and integrates a signal from the capstan and produces a signal which is proportional to the average direction and magnitude of the tape transported by the capstan.

Box 7 contains a compensating circuit for component variables and other variables. The integrated signal from Box 4, which is proportional to the position of the tape loop in the column, is level adjusted in Box 7 to give a zero output when the tape is at a normal or rest position in the vacuum column indicated at A in FIG. 1. The polarity of this voltage and the differential voltage from Box 5 is the same as the polarity of the capstan voltage from Box 6, as tape is removed from the column.

Box 8 contains a mixer circuit which adds together the outputs of Boxes 5, 6 and 7. The magnitude of the resulting output voltage signal determines the rotational velocity of the reel, and the sign of this voltage determines the direction of reel rotation. Zero volts causes no rotation.

Box 9 contains a servo motor control circuit. It converts the output of stage 8 into a low frequency A.C. signal which is fed into the servo motor.

The tape reel drive mechanism for each reel operates independently of the other. Lead wires 51 and 52 connect the plates of the variable capacitor 43, 25 to the control unit 49. Lead wire 51 is connected to the perforated metal wall 35, which makes electrical contact with the metal coating 43 on te sensing tape 41, the movable plate. The same connections are made on the right-hand side of the tape feed. This is illustrated in FIG. 1 of the drawings.

In the forward direction, the drive capstans 12 and 14 rotate to remove tape from vacuum column 11, and to discharge it into vacuum column 15. As the tape loop in vacuum column 11 shortens, a higher voltage signal with respect to the voltage signal at the normal position as previously mentioned causes servo motor 19 to rotate file reel 7 in a counterclockwise direction to unreel tape 9 into vacuum column 11. A zero change in voltage is delivered to servo motor 19 when the file reel 7 puts tape into vacuum column 11 at the same speed as capstan 12 removes tape from within said column. At the same time, the tape loop in vacuum column 15 lengths, and a lower signal with respect to the signal at the normal position tells servo motor 20 to rotate in a counterclockwise direction to remove tape from vacuum column 15, and reel it onto machine reel 17. When the rate of change of net tape in column 15 is zero, no change in voltage is delivered to servo motor 20.

In the reverse direction, the drive capstans rotate in a counterclockwise direction to remove tape from vacuum column 15, and to discharge it into vacuum column 11. As the tape loop in vacuum column 15 shortens, a higher signal with respect to the signal at the normal position tells machine reel 17 to rotate in a clockwise direction to unreel tape into vacuum column 15. At the same time, the loop in vacuum column 11 lengthens, and a lower signal with respect to the signal at the normal position tells file reel 7 to rotate in a clockwise direction, to reel tape from vacuum column 11.

*Operation*

Assuming the tape feed machine is stopped, the tape 9 is distributed in the vacuum columns as illustrated in FIG. 1 of the drawings. The normal or rest positions A—A′ of the tape loops in vacuum columns 11 and 15, and the corresponding positions of the sensing tapes 41 and 42 in the control columns 21 and 22 are indicated in FIG. 1. The loops and the sensing tapes are at the normal capacitance level. The zero voltage signals from the control circuits 49 and 50 permit servo motors 19 and 20 and consequently the file reel 7 and the machine reel 17 to remain stationary. The vacuum drive capstans 12 and 14 are held stationary by their respective brake means (not shown).

When a read signal is delivered to the control means of the vacuum drive capstans 12 and 14, the respective capstan brake mechanisms are released and the constant speed capstan drive motors are connected to the clockwise rotation clutch mechanisms (not shown). The capstans 12 and 14 are immediately accelerated in a clockwise direction at a high rate of speed and translate the tape therewith at its rated velocity. This acceleration from rest to rated velocity is very rapid.

As the tape 9 moves from the position illustrated in FIG. 1 of the drawings, the tape in vacuum column 11 is removed at a relatively high rate by capstan 12, and in so doing shortens the overall length of the loop in vacuum column 11. At the same time the loop in column 11 shortens, the ripple in the sensing tape 41 redistributes itself to move upward. At the instant the ripple in sensing tape 41 begins to move upward, the increase in capacitance is sensed by control circuit 49, which delivers a positive voltage signal to servo motor 19. The file reel 7 starts to accelerate immediately in a counterclockwise direction to unreel tape from the file reel 7 into vacuum column 11.

Since the inertia of the reel 7 and the storage tape 6 is relatively high when compared to a capstan drive and its associated mechanisms, the rate of acceleration of the file reel 7 is considerably below the requirements of the vacuum drive capstan 12. It is during this interval that tape 9 is being removed from column 11 by vacuum drive capstan 12 at a faster rate than can be supplied by reel 7. This causes the overall length of the tape loop in vacuum column 11 to shorten continuously, but at a lower rate. At the same time, the sensing tape 41 continuously redistributes itself so that the ripple in the sensing tape 41 moves continuously upward. The capacitance continues to increase as the amount of sensing tape 41 disposed against the perforated metal partition 25 increases. The increasing positive voltage signal from the control circuit 49 accelerates the file reel 7 to unreel tape 9 into column 11 at a rate approaching the speed at which it is being withdrawn from said column. Eventually, however, before the tape in the vacuum column 11 is consumed, the velocity of the tape 9 leaving the file reel 7 becomes the same as that of the tape removed from vacuum column 11 by the drive capsan 12. Since the change in voltage signal is proportional to the rate of change of net tape in vacuum column 11, the voltage signal from the control circuit 49 to servo motor 19 is constant. While tape is being translated in the forward direction, the tape loop remains in a relatively stable position C in the upper portion of the vacuum column 11.

Of course, while the above tape transfer operation is taking place in the left-hand column 11, the tape moving into the right-hand column 15 acts in a somewhat similar manner. However, with the clockwise rotation of capstan 14, the tape leaving capstan 14 is discharged into the right-hand vacuum column 15, and lengthens its loop therein. At the same time the loop in column 15 lengthens, the ripple in the sensing tape 42 moves downward. At the instant the ripple in the sensing tape 42 begins to move downward, the decrease in capacitance is sensed by control circuit 50, which delivers a negative voltage signal to servo motor 20. The machine reel 17 begins to accelerate immediately in a counterclockwise direction to remove tape from vacuum column 15 and reel it onto machine reel 17.

The difference in inertia between the machine reel 17 and capstan 14 causes tape to be discharged into column 15 by capstan 14 at a faster rate than can be removed by machine reel 17. This causes the overall length of the tape loop in vacuum column 15 to lengthen continuously, but at a decreasing rate. At the same time, the sensing tape 42 continuously redistributes itself so that the ripple in sensing tape 42 moves continuously downward. The capacitance continues to decrease as the amount of sensing tape 42 against perforated metal partition 26 decreases. The increasing negative voltage signal from control circuit 50 accelerates the machine reel 17 to remove tape from vacuum column 15 at a rate approaching the speed at which it is being discharged into said column. Eventually, however, before the tape loop in the vacuum column 15 overloads, the velocity of the tape being reeled onto machine reel 17 becomes the same as that of the tape discharged into vacuum column 15 by drive capstan 14. Since the change in voltage signal is proportional to the rate of change of net tape in vacuum column 15, the voltage signal from control circuit 50 to servo motor 20 is constant. While tape is being translated in the forward direction, the tape loop remains in a relatively stable position C′ in the lower portion of the vacuum column 15.

When the drive capstans 12 and 14 receive a stop signal, the associated brake means are connected and the capstan drive motors are stopped immediately. This deceleration from rated velocity to stop is very rapid. The file reel 7 continues to feed tape 9 into column 11. At the same time the tape loop lengthens in column 11, the ripple in the sensing tape 41 moves downward. The capacitance decreases as the amount of sensing tape 41 disposed against the perforated metal partition decreases. A decreasing positive voltage signal from the control circuit 49 decelerates the file reel 7. The tape loop in column 11 keeps increasing in length, but at a lower rate. As the tape loop moves toward the normal position in the column 11, the velocity of the tape 9 leaving the file reel 7 approaches zero. The voltage signal from the control circuit 49 to servo motor 19 is zero when the tape loop is at the normal or rest position A in the vacuum column 11.

At the same time that the tape loop in the left-hand column 11 is moving toward the rest position, the tape loop in the right-hand column 15 acts in a somewhat similar manner. With the capstans stopped, the machine reel 17 continues to remove tape from vacuum column 15 and the ripple in the sensing tape 42 moves upward. The capacitance increases as the amount of sensing tape 42 against the perforated metal partition increases. A decreasing negative voltage signal from the control circuit 50 decelerates the machine reel 17. The tape loop in column 15 keeps decreasing in length, but at a lower rate. As the tape loop moves toward the normal position in the column 15, the velocity of the tape being reeled on machine reel 17 approaches zero. The voltage signal from the control circuit 50 to servo motor 20 is zero when the tape loop is at the normal or rest position A′ in the vacuum column 15.

A reverse or rewind operation is accomplished in exactly the same manner as a reading or writing operation, except that the direction of the capstans 12 and 14 are reversed along with the rotation of the file and machine reels 7 and 17, respectively; the operation of the columns is similar, but reversed.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a tape storage and controlling device, the combination of means including an electrically conductive wall forming an elongated chamber having an open end, said conductive wall having longitudinally extending aperture means, a tape passing into and out of said chamber to provide an isolated looped tape section, portions of said looped section being in contact with walls of said chamber, including said conductive wall, to close off a portion of said chamber, said looped section being variable in length within said chamber; means to maintain a vacuum in said closed portion of said chamber, a flexible conductive web mounted near said aperture means outside of said chamber, a variable portion of said web being pressed by the pressure difference communicated through said aperture means against the portion of said conductive wall defining the closed off portion of said chamber, means to insulate electrically said web from said conductive wall, means to bend away from said conductive wall that portion of said flexible web not pressed against said conductive wall, and means responsive to the resulting capacitance between said flexible web and said conductive wall to control the length of said looped section in said chamber.

2. In a tape storage and feed control mechanism, means including an electrically conductive wall forming an elongated chamber having one open end and adapted to fold running tape into a variable length free loop, said electrically conductive wall having longitudinally extending aperture means, sections of said loop contacting said chamber so as to form an isolated space in the end of said chamber, one point of contact being along said wall so as to include in said space a variable portion of said aperture means, evacuation means for maintaining vacuum in said space, a conducting web flexibly disposed to be pressed against said wall by pressure difference transmitted through said aperture means, means for insulating said web from said wall, means to bend away from said wall that portion of said web not pressed against said wall by pressure difference, and means responsive to the amount of said web pressed against said wall for continuously controlling the amount of tape in said loop.

3. In a tape feeding device of the type adapted to store and control a loose length of running tape in the form of a free loop, means comprising a plurality of walls forming a storage column having an open end and a closed end, one of said walls being fitted with a longitudinally extending aperture means, portions of said loop contacting said apertured wall and the wall opposite thereto, means to evacuate the chamber formed between said loop and said closed end of the column, a flexible conducting web disposed to be pressed to said wall by fluid pressure difference communicated through said aperture means, means to insulate said wall from said web, means to bend away from said wall the portion of web not so pressed against said wall, and means responsive to the amount of said web pressed against said wall for controlling the length of tape in said loop.

4. In a web storing and sensing device that controls the feeding of a web through a storage loop, the combination of a loop confining means, with an open end and a closed end, composed of a plurality of walls, one wall having elongated aperture means, means to cause the passage of a web into and out of said chamber while maintaining a portion of said web in a free loop, short lengths of said web contacting said one wall and the wall opposite thereto, thereby forming an isolated chamber with said closed end of said confining means, evacuation means connected to said isolated chamber for maintaining a constant low pressure in said chamber, vacuum responsive means for continuously sensing the length of said chamber isolated by said web, and means responsive to said sensing means for controlling the feeding of said web.

5. In a tape feeding machine in which a first driving means feeds tape into a loop for removal by a second driving means, the combination with said driving means of a storage column adapted to maintain said loop of tape while running or stationary, means to sense the position and rate of change of position of the bottom of said loop longitudinally of said storage column, and means operated by said sensing means to control the direction of said first driving means according to the position of said loop bottom and to control the acceleration of said first driving means according to the rate of change of position of said loop bottom in said column.

6. In a tape feed device for feeding tape from a tape storage station driven by a rotary driving means through a loop to a tape utilization station driven by a second driving means, the combination with said driving means, of an elongated chamber between said stations adapted to maintain a portion of the feeding tape in a free loop, means to sense the position of the bottom of said loop within said chamber, and control means operated by said position sensing means to control the direction of rotation of said rotary driving means in response to the relation of said loop bottom to a mean position within said column, and to control the rotary acceleration of said rotary driving means in response to the rate of change of said loop position.

7. In a web feeding device, web utilization means, a first web feeding mechanism to feed the web intermittently through said web utilization means, means comprising a plurality of walls forming a storage column for holding a loop of the web in position to be withdrawn by said first web feeding mechanism, a second web feeding mechanism for supplying the web to said column as it is withdrawn by said first web feeding mechanism, means including a variable speed motor for driving said second web feeding mechanism, and control means for said motor including means for sensing the changing positions of the reversely curved portion of said loop in said column due to variations in relative speed of said web feeding mechanisms, said sensing means being adapted to cause changes in response to said control means varying incrementally as a function of the rate of change of position of said reversely curved portion, whereby the speed of said motor is adjusted to match the rate of said second web feeding mechanism to that of said first web feeding mechanism with rates of acceleration proportional to the difference in the speeds of said first and second web feeding mechanisms.

8. In a web feeding device, web utilization means, a first web feeding mechanism to feed the web intermittently through said web utilization means, means comprising a plurality of walls forming a storage column for holding a loop of the web in position to be withdrawn by said first web feeding mechanism, a second web feeding mechanism for supplying the web to said column as it is withdrawn by said first web feeding mechanism, means including a variable speed motor for driving said second web feeding mechanism, a plurality of walls forming a control column parallel to said storage column, one of said last-mentioned walls being a common wall between said columns, a sensing device comprising a flexible conductive sheet suspended in said control column so as to face said common wall but normally to be separated therefrom, means for evacuating the outer space in said storage column beyond the reversely curved end of said loop, said common wall having longitudinally extending aperture means through which air is drawn from said control column into said outer space in said storage column, whereby the portion of said flexible conductive sheet opposite said outer space of said storage column is pressed toward said common wall, means to insulate said flexible conductive sheet from said common wall but at a distance sufficiently close to establish an effective capacitance structure between said portion of said flexible conductive sheet and said common wall, the capacitance of which varies in proportion to the area of said flexible conductive sheet pressed toward said common wall, and control means for said motor including circuit means connected to said flexible conductive sheet and said common wall and adapted to vary the speed of said motor incrementally as a function of said capacitance and thereby as a function of the position of the reversely curved portion of said loop in said storage column.

9. A web feeding device as described in claim 8, characterized by the fact that said first web feeding device and said motor are reversible, and said motor control means is adapted to stop said motor when said capacitance is at an intermediate, normal value and to cause said motor to run in either one direction or the other at said incrementally varying speed, according to the direction and amount of variation of said capacitance from said normal value.

10. In a tape handling machine of the type having a column into which tape is urged by fluid pressure, the combination with said column of means for maintaining fluid pressure within said column, a movable element disposed so that differential amounts of area of said element are exposed to said fluid pressure in proportion to the position of said tape within said column, whereby said movable element, under the urging of said fluid pressure, will move by amounts proportional to the position of tape in said column, and means responsive to the movement of the element for providing a manifestation of the position of tape in the column.

11. In a web storing and sensing device that controls the feeding of a web through a storage loop, the combination of a loop confining means, with an open end and a closed end, composed of a plurality of walls, means to cause the passage of a web into and out of said chamber while maintaining a portion of said web in a free loop, short lengths of said web contacting opposite ones of said walls, thereby forming an isolated chamber with said closed end of said confining means, evacuation means connected to said isolated chamber for maintaining a constant low fluid pressure in said chamber, a movable element disposed near said loop and responsive to said fluid pressure, said pressure being operative to draw said loop down into said chamber and to exert a force on said movable element continuously proportional to the position of said loop with respect thereto, and means responsive to the movement of said element for providing a continuous manifestation of the position of said loop within said chamber.

12. Apparatus for sensing and producing a continuous indication of the length of a slack loop in a moving strip of flexible material comprising a hollow rectangular tube having one end thereof closed, one wall of the tube having a laminated structure including a pair of conductive plates separated by a layer of dielectric material, a first one of said plates being perforated, the slack loop being positioned in the open end of the tube, the tube having an internal width between a pair of opposite walls thereof substantially equal to the width of the tape, whereby the bight portion of slack loop within the tube effectively closes off the open end of the tube, and means for maintaining a vacuum in the region between the bight portion of the slack loop and the closed end of the tube, whereby the second one of said plates of the laminated wall is exposed to a pressure differential between opposite surfaces thereof in the region of the laminated wall between the closed end of the tube and the bight portion of the loop.

References Cited in the file of this patent

UNITED STATES PATENTS

| | | |
|---|---|---|
| 1,562,629 | Gernsback | Nov. 24, 1925 |
| 1,611,264 | Burkwest | Dec. 21, 1926 |
| 1,665,616 | Trump | Apr. 10, 1928 |
| 2,778,634 | Gams et al. | Jan. 22, 1937 |
| 2,792,217 | Weidenhammer et al. | May 14, 1957 |
| 2,814,676 | House | Nov. 26, 1957 |